United States Patent [19]
Yasutake et al.

[11] Patent Number: 6,078,044
[45] Date of Patent: *Jun. 20, 2000

[54] PROBE SCANNING APPARATUS

[75] Inventors: Masatoshi Yasutake; Yukihiro Sato, both of Chiba, Japan

[73] Assignee: Seiko Instruments Inc., Japan

[*] Notice: This patent is subject to a terminal disclaimer.

[21] Appl. No.: 08/855,543

[22] Filed: May 13, 1997

[51] Int. Cl.[7] .................................................. H01J 37/00
[52] U.S. Cl. ...................................... 250/306; 250/442.11
[58] Field of Search .................................. 250/306, 307, 250/442.11

[56] References Cited

U.S. PATENT DOCUMENTS

| | | | |
|---|---|---|---|
| 5,201,392 | 4/1993 | Kramer .................................. | 192/588 |
| 5,223,713 | 6/1993 | Uozumi et al. ..................... | 250/442.11 |
| 5,276,545 | 1/1994 | Daun et al. ............................. | 359/198 |
| 5,410,910 | 5/1995 | Somlyo et al. ......................... | 250/306 |
| 5,513,518 | 5/1996 | Lindsay .................................... | 250/306 |
| 5,672,816 | 9/1997 | Park et al. ............................... | 250/306 |
| 5,808,302 | 9/1998 | Binnig et al. ........................... | 250/306 |

FOREIGN PATENT DOCUMENTS

| | | |
|---|---|---|
| 124472A2 | 3/1984 | European Pat. Off. . |
| 9113519 | 5/1997 | Japan . |
| WO 8804047 | 6/1988 | WIPO . |
| WO 9607074 | 3/1996 | WIPO . |

OTHER PUBLICATIONS

Review of Scientific Instruments, vol. 64, No. 11, Nov. 1, 1993, pp. 2153–2156, D. N. Davydov et al., "Cryogenic Scanning Tunneling Microscope With A Magnetic Coarse Approach".

*Primary Examiner*—Bruce C. Anderson
*Attorney, Agent, or Firm*—Admas & Wilks

[57] ABSTRACT

A probe scanning apparatus for use in a device for measuring the shape of a surface or the physical properties of a sample comprises a probe and voice coil motors for generating a moving force for moving the probe in each of three directions x, y and z upon activation of the voice coil motors. A probe supporting mechanism is mounted for movement in the three directions x, y and z by the moving forces generated by the voice coil motors upon activation thereof to effect coarse/fine movement of the probe in the direction z and to scan the probe in the directions x and y.

21 Claims, 7 Drawing Sheets

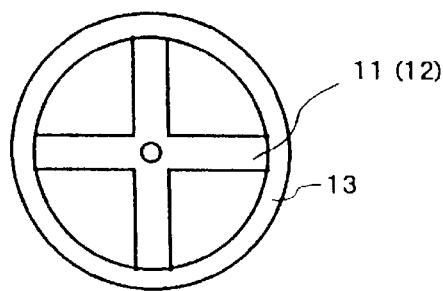
FIG. 2A
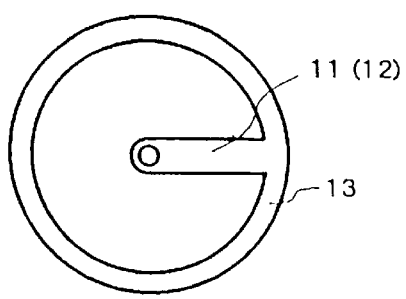
FIG. 2B
FIG. 3
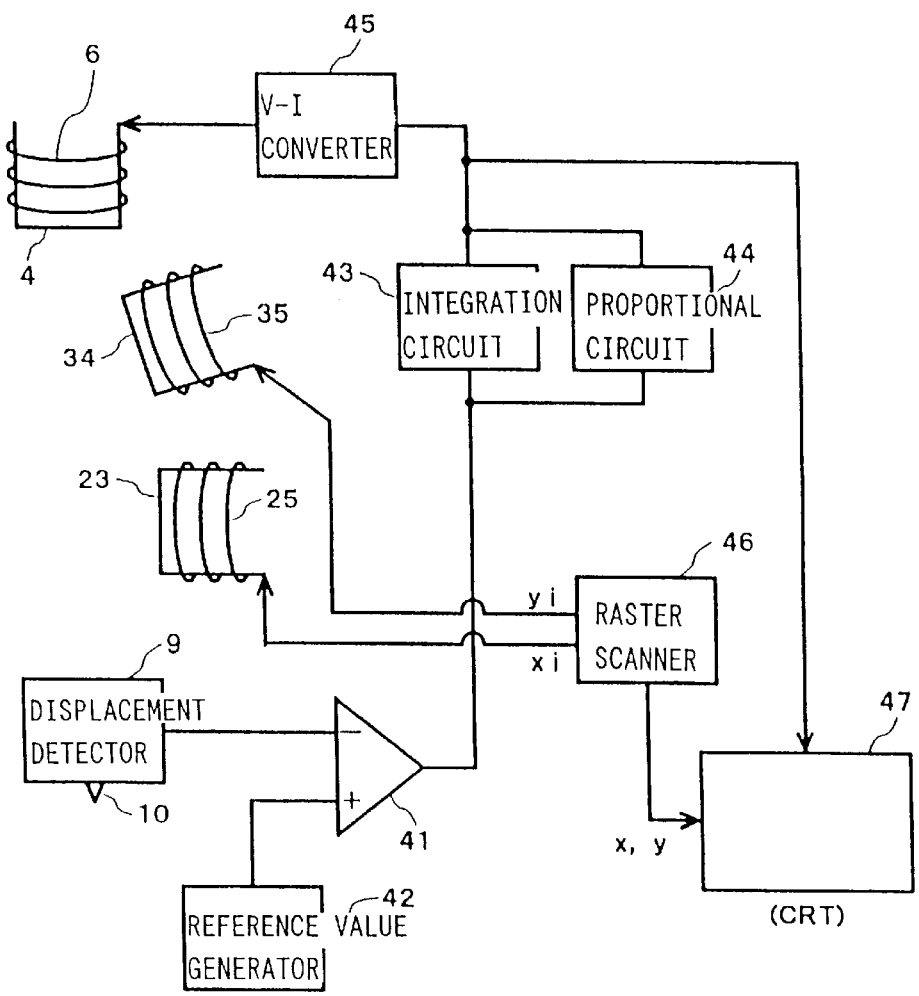

FIG. 5

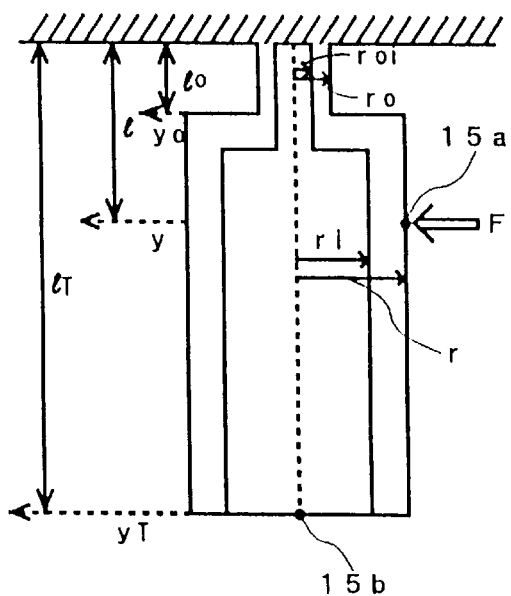

F : force
$\ell 0$ : the length of the thinner tube portion
$\ell$ : the length to the force point
$\ell T$ : the length to the action point(scanning portion)
y0 : deflection of the thinner tube portion
y : deflection at the force point
yT : deflection at the action point
r0 : radius of the outer side of the thinner tube portion
r0i : radius of the inner side of the thinner tube portion
r : radius of the outer side of the thicker tube portion
ri : radius of the inner side of the thicker tube portion

PROBE SCANNING APPARATUS

BACKGROUND OF THE INVENTION

The present invention relates to a probe scanning apparatus for a scanning type probe microscope or the like and, more particularly, to a probe scanning apparatus which is enabled to scan a probe by integrating a mechanism for a z-coarse movement to bring a miniature probe close to a sample surface and for z-fine movement to control the distance between the miniature probe and the sample surface and a mechanism for x- and y-scans to scan the sample surface and which is additionally given a zooming function.

One example of the scanning type probe microscope of the prior art will be described with reference to FIG. 8. On the upper face of a cylindrical piezo element 55, there is mounted a sample bed 51. On this sample bed 51, there is placed a sample 52. Over this sample 52, there is oppositely disposed a miniature probe 54 which is carried on the free end of a cantilever 53. On the cylindrical surface of the piezo element 55, there are formed an electrode 56, which is wound around the cylindrical surface for the z-fine movement, and four quarter electrodes 57a, 57b (although not shown), 58a and 58b (although not shown) for the x- and y-scanning operations. A pulse motor 60 is given a performance of about 500 angstroms/pulse so that a screw rod 61 is turned to move the piezo element 55 coarsely in the direction z when the pulse motor 60 is activated.

The warpage of the cantilever 53 is detected by a position detector 73 in terms of a laser beam 72 outputted from a laser generator 71. The position detector 73 is composed of four quarter light detecting electrodes and is so positioned that the spot of the laser beam 72 comes to the center of the four quarter electrodes when the warpage of the cantilever 53 is 0. As a result, when a warpage occurs in the cantilever 53, the spot of the laser beam 72 moves over the four quarter electrodes so that a difference is made among the voltages outputted from the four quarter electrodes. These voltages are amplified by an amplifier 74 and inputted to a differential amplifier 75. The inverted input terminal (−) of this amplifier 74 is set with a reference value of the warpage of the cantilever so that the output of the differential amplifier 75 is 0 when the warpage is 0, for example.

The differential output of the differential amplifier 75 is inputted to an integration circuit 76 and a proportional circuit 77 so that the difference is averaged in the integration circuit 76 whereas its high-frequency component is extracted in the proportional circuit 77, The averaged difference and the high-frequency component are synthesized, and the synthesized output is then amplified by a voltage amplifier 78 until it is applied to the electrode 56. The circuit, as composed of the position detector 73, the amplifier 74, the differential amplifier 75, the integration circuit 76, the proportional circuit 77 and the voltage amplifier 78, defines a feedback circuit. A CRT 80 receives the x- and y-direction scanning signals from a raster scanner 81 and the warpage signal of the cantilever 53 from a line 82 so that it displays either the shape of the surface of the sample 52 or the physical properties on the display.

In the scanning type probe microscope of the prior art, as described above: the z-coarse movement is effected by the pulse motor 60 and the screw rod 61; the z-fine movement is effected by applying the feedback signal to the cylindrical electrode 56 on the piezo element 55; and the x- and y-scans are effected by applying the x- and y-scanning signals, as outputted from the raster scanner 81, to the four quarter electrodes 57a, 57b, 58a and 58b.

Since the prior art uses the piezo scanner having the construction described above, the relation (i.e., the applied voltage—displacement characteristics) between the voltage, as applied to the electrode of the piezo element, and the displacement of the same is non-linear, thereby causing a problem that the displacement cannot be enlarged. Moreover, a voltage as high as several hundred to one thousand volts has to be applied to the electrode. This makes it necessary to shield the periphery and to provide a protection circuit for dropping the voltage when the apparatus is opened. This raises a problem that the apparatus is difficult to handle.

Therefore, the owner of the present application developed and filed a patent application in Japan under Japanese Patent Application No. 25301/1996) and in The United States under Ser. No. 08/800,074 filed Feb. 12, 1997, now U.S. Pat. No. 5,945,671 for a sample positioning apparatus in which the pulse motors and screws for the z-coarse moving mechanism are replaced by a housing having a viscous element, a heater mechanism and a voice coil mechanism and in which the piezo element for the z-fine moving element is replaced by a spring element.

According to this sample positioning apparatus, all of the foregoing problems, associated with the piezo scanner can be solved, and what is provided is an apparatus in which the z-coarse mechanism and the z-fine mechanism are integrated. However, the apparatus has failed to take consideration the integration of those mechanisms with an x-y scanning mechanism. Nor any consideration is taken into the provision of a zooming function.

An object of the present invention is to eliminate the above-specified problems of the prior art and to provide a probe scanning apparatus of simple construction, in which z-direction coarse/fine mechanisms and x- and y-scanning mechanisms are integrated and which is provided with a zooming function.

SUMMARY OF THE INVENTION

In order to achieve the above-specified object, according to the present invention, there is provided a probe scanning apparatus to be used in a device for measuring the shape of the surface or the physical properties of a sample by bringing the probe close to the sample surface. The probe scanning apparatus comprises: voice coil motors for generating moving forces in three directions x, y and z; probe supporting means mounted for movement in the three directions x, y and z by the forces generated by the voice coil motors; and zooming means for realizing a zooming function by limiting the moving range of the probe supporting means.

According to the present invention, the probe can be moved coarsely/finely in the direction z and scanned in the directions x and y by the voice coil motors in the three directions x, y and z, as integrated in the casing. As a result, it is possible to solve all the problems owned by the piezo scanner of the prior art and to scan the probe.

According to the present invention, any region in the range to be scanned by the probe supporting means can be zoomed. As a result, there can be achieved an excellent effect that any position of the sample surface can be measured in an enlarged scale.

BRIEF DESCRIPTION OF THE DRAWINGS

FIGS. 2A and 2B is a top plan view showing one specific example of the first and second springs of FIG. 1.

FIG. 3 is a block diagram for driving the voice coil motors in the directions x, y and z.

FIG. 5 is a diagram for explaining the deflections of the thinner tube portion and the thicker tube portion.

DETAILED DESCRIPTION OF THE INVENTION

Figure 1:
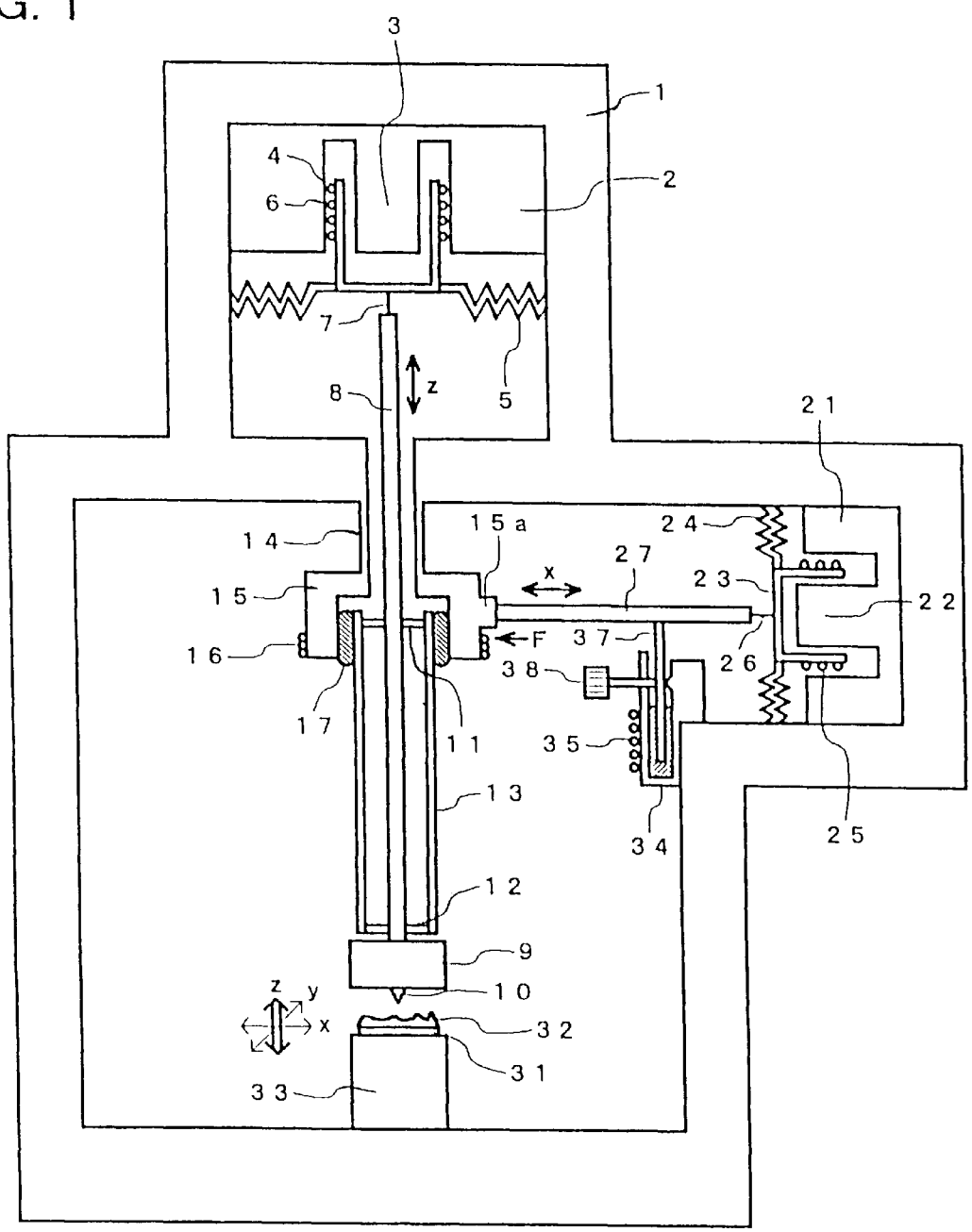
FIG. 1 is a construction diagram of one embodiment of the probe scanning apparatus of the present invention.

The present invention will be described in detail with reference to the accompanying drawings. FIG. 1 is a diagram showing a construction of a probe canning apparatus according to one embodiment of the present invention. As shown, a magnet 2 is fixed in a casing 1, and a moving element 4 is loosely fitted on a core rod 3 of the magnet 2. The moving element 4 is elastically supported in the casing 1 by a membrane 5, and a coil is wound around the moving element 4. The magnet 2, core rod 3, moving element 4, membrane 5 and coil 6 constitute together a voice coil motor, as used in a speaker or the like.

On the moving element 4, there is fixed one end portion of a fine wire 7, the other end portion of which is fixed at one end of a rod or spindle 8 extending in a direction z. On the other end of this spindle 8, there is fixed a displacement detector 9, on which is mounted a probe 10 such as a cantilever. Moreover, the spindle 8 is supported by an intermediate cylinder 13 at its central portion through a first spring 11 and at its lower end portion through a second spring 12. These first and second springs 11 and 12 are constructed, as shown at (a) and (b) in FIG. 2, of a cross-shaped or ordinary leaf spring disposed in the intermediate cylinder 13. Incidentally, the fine wire 7 acts to absorb the strain of the spindle 8, as caused with respect to the moving element 4 when the spindle 8 is scanned in directions x and y, as will be described hereinafter.

The casing 1 is equipped with a thinner tube portion 14 protruding into the sample chamber and a thicker tube portion 15 leading from the thinner tube portion 14, and heater coil 16 is wound around a portion of the thicker tube portion 15. Between the thicker tube portion 15 and the intermediate cylinder 13, on the other hand, there is interposed a viscous element 17 which is made of a polymer of glycol phthalate. This viscous element 17 exhibits properties similar to those of a solid at the room temperature but varies in viscosity when heated by energizing the heater coil 16.

In the casing 1, there is further mounted a second magnet 21, and a moving element 23 is loosely fitted on the core rod 22 of the second magnet 21. The moving element 23 is elastically supported by the casing 1 through a membrane 24, and a coil 25 is wound around the moving element 23. On the moving element 23, there is fixed one end of a fine wire 26, the other end of which is fixed to a rod or spindle 27 in the direction x. The other end of the spindle 27 is fixed on the side portion of the thicker tube portion 15. The second magnet 21, core rod 22, moving element 23, membrane 24 and coil 25 constitute together a voice coil motor similar to the foregoing one. The voice coil motor acts upon the spindle 27 in the direction x, and a not-shown voice coil motor having a similar construction is disposed in a 90-degree turned position to act upon a spindle in the direction y.

At a position confronting the probe 10, there is disposed a sample bed 31, on which is placed a sample 32 to be detected. The sample bed 31 is carried on coarse x-, y- and z-stages 33.

In the vicinity of the second magnet 21, on the other hand, there is disposed a zoom device. This zoom device is constructed of a holder 34, a heating coil 35, a viscous element 36 fitted in the holder 34, a leaf spring 37 fixed at its one end on the spindle 27 and embedded at its other end in the viscous element 36, and a clamp unit 38. The viscous element 36 may be made of a material similar to that of the foregoing viscous element 17. In addition, the clamp unit 38 is not always indispensable.

FIG. 3 is a block diagram showing a schematic construction of a z-coarse/fine circuit and x- and y-scanning circuits, as connected with the probe scanning apparatus of FIG. 1. When the displacement of the probe 10 such as a warpage of the cantilever is detected by the displacement detector 9, this detected signal is compared with a reference value coming from a reference value generator 42 by a differential amplifier 41. Since this reference value is equalized to the value outputted from the displacement detector 9 when the distance between the probe 10 and the sample surface takes a predetermined value, the differential amplifier 41 outputs a signal having a magnitude according to a displacement at an instant when the distance between the probe 10 and the sample surface is displaced from the predetermined value. The output of the differential amplifier 41 is processed by an integration circuit 43 and a proportional circuit 44 and enters a V-I converter 45. This V-I converter 45 converts the inputted voltage into a current and feeds it to the coil 4.

On the other hand, a raster scanner 46 feeds x- and y-direction scanning signal currents xi and yi, respectively, to the coils 25 and 35 which are wound around the x-direction moving element 23 and the y-direction moving element 34. The raster scanner 46 further feeds x- and y-scanning signals to a CRT 47. Inspection data such as the shape or physical properties of the sample surface are fetched from the input side of the V-I converter 45 to the CRT 47.

The operations of the present embodiment will be described with reference to FIGS. 1 and 3. The first description will be made on the coarse moving operations when the probe 10 is brought toward the surface of the sample 32. Since the not-shown temperature controller is connected with the heater coil 16, it is turned on at first to energize the heater coil 16 to thereby heat the viscous element 17. The viscosity of the viscous element 17, if made of polymer or the like, abruptly drops when it is heated to a temperature slightly higher than its melting point.

Next, there is activated the feedback circuit which is composed of the displacement detector 9, the differential amplifier 41, the integration circuit 43, the proportional circuit 44 and the V-I converter 45. Since the distance between the probe 10 and the sample surface is large at first, the difference between the reference value, as outputted from the reference value generator 42, and the detected displacement value from the displacement detector 9 is so that that a high signal voltage is outputted from the differential amplifier 41. This signal voltage is processed by the integration circuit 43 and the proportional circuit 44 and is converted by the V-I converter 45 into an electric current I to flow through the coil 6 wound around the moving element 4.

Then, a force to move the moving element 4 downward is generated by the magnetic field of the magnet 2 and the current I flowing through the coil 6. As a result, the fine wire 7, as connected to the moving element 4, and the spindle 8 receive the downward force, and the intermediate cylinder 13 receives the force in the same direction from the spindle 8 through the first and second springs 11 and 12. Then, the intermediate cylinder 13 is easily moved downward because the viscosity of the viscous element 17 is low. This movement is quickly made because the current I flowing through the coil 6 is high.

As the probe 10 is thus brought closer to the surface of the sample 32 so that their distance comes to a predetermined value, the detected displacement value from the displacement detector 9 and the reference value from the reference value generator 42 become substantially equal. As a result, the signal voltage to be outputted from the differential amplifier 41 approaches zero, and the current I to flow through the coil 6 becomes low so that the z-coarse movement stops. The timing for turning off the temperature controller is set either at the stopping time of the z-coarse movement or at a slightly earlier time while considering the remaining heat. When the heating of the viscous element 17 by the heater coil 16 is ended, the viscosity of the viscous element rises. Especially in the case in which polymer or the like is used, the solidification starts when the melting point overcomes, so that the intermediate cylinder 13 and the thicker tube portion 15 are firmly fixed.

In the description thus far made, the z-coarse movement is made by using the feedback circuit. By providing a separate constant current power source, however, the coil 6 may be fed with the current from the constant current power source so that the goal of the z-coarse movement may be detected in terms of the attenuation or warpage of the amplitude of the vibration of the cantilever.

Figure 4A:
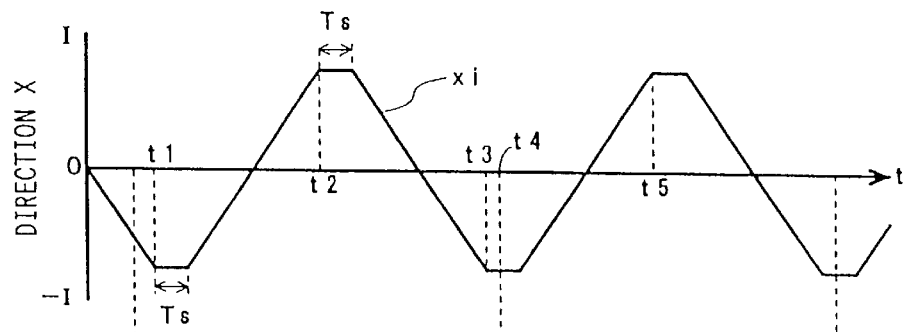
FIGS. 4A and 4B are waveform diagrams of scanning currents to be fed to the voice coil motors in the directions x and y.
Figure 4B:
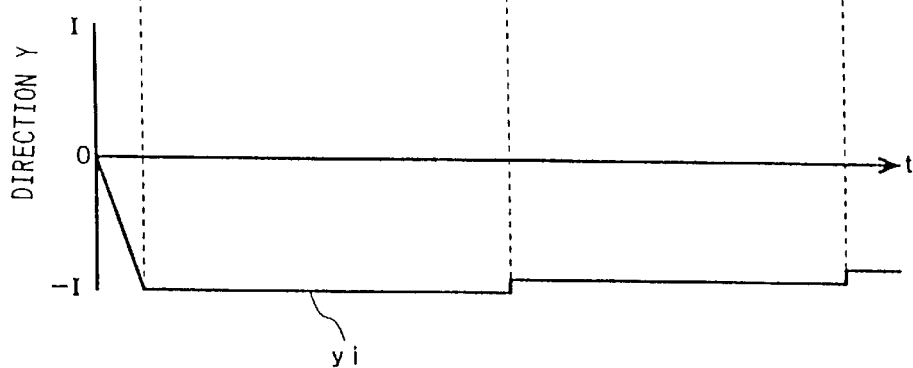
Figure 4C:
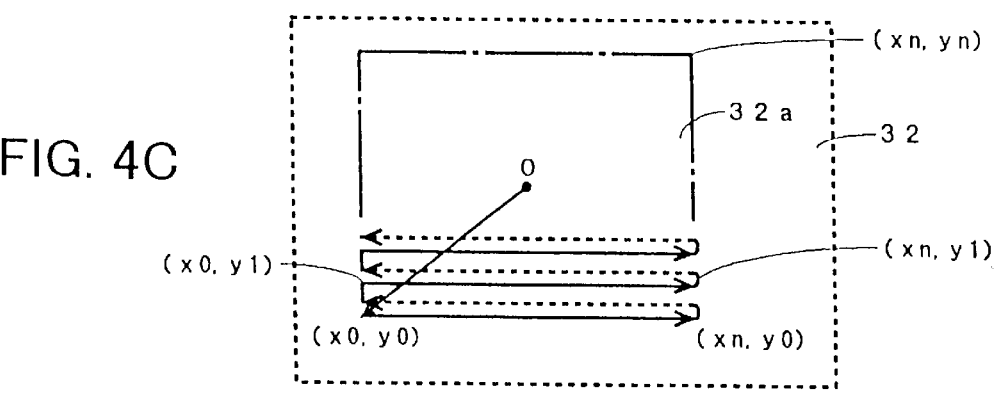
FIG. 4C is a diagram of the scanning regions of the sample surface in the directions x and y.

When the z-coarse movement is ended, the x- and y-scanning operations and the z-fine movement are simultaneously started. First of all, the constructions of the x- and y-scanning mechanisms and their operations at the time of measuring the sample surface by the ordinary method will be described with reference to FIGS. 1 and 4. Here: FIG. 4(a) illustrates the scanning current xi in the direction x; FIG. 4(b) illustrates the scanning current yi in the direction y; and FIG. 4(c) illustrates the x- and y-scanning regions of the sample surface. The reference numeral 32 designates the sample having an x- and y-scanning region 32a. Incidentally, the scanning operations in the directions x and y are performed by the identical or similar mechanisms so that they will be described by noting the scanning mechanism in the direction x as their representative one. When the surface temperature is to be measured by the ordinary method, moreover, the heating coil 35 is excited by the not-shown temperature controller to soften the viscous element 36.

When the coil 25, as wound around the moving element 23 loosely fitted on the core rod 22 of the magnet 21 of FIG. 1, is fed with the electric current xi having a waveform, as shown in FIG. 4 (a), from the raster scanner 46, the fine wire 26 in the direction x, as connected with the moving element 23, and the spindle 27 receive the force in the direction x.

If the current I flows in a negative direction into the coil 25 so that the spindle 27 is pushed leftward of FIG. 1, the thicker tube portion 15 receives a force F, as shown, at a point 15a of force. Then, the thicker tube portion 15 is deviated in the same direction as that of the force F by the deflection of the thinner tube portion 14. If the current I flows in the positive direction into the coil 25 so that the spindle 27 is pulled rightward of FIG. 1, on the other hand, the thicker tube portion 15 receives the force −F at the force point 15a. Then, the thicker tube portion 15 is deviated in the same direction as that of the force −F by the backward deflection of the thinner tube portion 14. When the thicker tube portion 15 is deviated in the direction from −x to +x, the probe 10 is widened in its scanning width and scanned in the direction from −x to +x because the it is connected to the thicker tube portion 15 through the spindle 8, the first and second springs 11 and 12, the intermediate cylinder 13 and the viscous element 17.

Next, the operations thus far described will be quantitatively described with reference to FIG. 5. FIG. 5 is a conceptional diagram schematically showing the probe 10 which is attached through the thinner tube portion 14, the thicker tube portion 15 and the intermediate cylinder 13 of FIG. 1. It is assumed that the probe 10 is be disposed at a point 15b of action of FIG. 5. If the force F is applied to the force point 15a, the deflection y at the force point 15a is expressed by the following formula (1):

[Formula 1]

$$y = F/3EI_1 E \{l^3 + l_0(3l^2 - 3ll_0 - l_0^2)(I_1/I_0 - 1)\} \qquad (1),$$

wherein:

$$I_1 = \pi/4 \cdot (r^4 - ri^4);$$

and $$I_0 = \pi/4 \cdot (ro^4 - roi^4)$$

Here, letter E designates the Young's modulus of the thinner tube portion and the thicker tube portion. Letter $I_1$ designates a sectional moment of inertia of the thicker tube portion, and letter $I_0$ designates a sectional moment of inertia of the thinner tube portion. Next, the deflection $y_T$ at the action point 15b can be expressed by the following Formula:

[Formula 2]

$$y_T = y + (l_T - 1)\tan\theta \qquad (2),$$

wherein:

$$\theta = [dy/dx] = f\{l^2/2 - (ll_0 - l_0^2/2)(I_1/I_0 - 1)\},$$

Here, letter θ designates the angle of deflection at the force point 15a. It is found from this Formula that the deflection at the action point 15b, i.e., the scanning point is enlarged by $(l_T - 1)\tan\theta$ from the deflection y at the force point 15a.

Next, Formula (1) is differentiated for the variable $I_0$ into Formula (3):

[Formula 3]

$$dy/dl0 = -3\alpha(l_0^2 + 2ll_0 - l^2) \qquad (3)$$

wherein:

$$\alpha = F/3EI_1 \cdot (I/I_0 - 1).$$

In order to determine the maximum of the deflection at the force point 15a, the value of $I_0$ is determined for Formula (3)=0, as follows:

$$l_0 = (-1 \pm 2^{1/2})l.$$

Hence, $l_0=0.414l$, and the deflection y at the force point 15a is maximized if the ratio ($l_o/l$) between the length $l_0$ of the thinner tube portion and the length 1 to the force point is set at 0.414. Thus, optimization is achieved if the design is made to set $l_0/l=0.414$.

Reverting to FIG. 4, here will be described the x- and y-scanning operations. If both the x-scanning current xi and the y-scanning current yi are at 0, the probe 10 indicates one point O on the sample, as shown in FIG. 4(c). If a negative current −I, as illustrated, is added to the x-scanning current xi and the y-scanning current yi, the probe 10 comes at time t1 to a scanning origin (x0, y0) on the sample 32. Letters $T_s$ indicate a queuing time, as required for the probe 10 to change the scanning direction by 180 degrees. As the x-scanning current xi linearly increases, the probe 10 scans the sample 32 in the direction x and comes at time t2 to a scanning terminal (xn, y0) on the sample 32. During this time, the probe 10 makes the z-fine movement according to the shape of the surface of the sample 32 so that the information on the shape is outputted from the displacement detector 9.

For the time period between t2 and t3, the probe continues to scan on the same scanning line as before and returns at time t3 to the scanning origin (x0, y0). The information, as obtained from the probe 10 for this flyback period, can be prevented by blanking it from being displayed on the CRT 47. At time t4, the y-scanning current yi drastically increases so that the probe 10 comes to a position (x0, y1). For a period from t4 to t5, moreover, the scanning operation in the direction x is started from the position (x0, y1). In this meanwhile, the probe 10 makes the z-fine movement according to the shape of the surface of the sample 32 so that the information on the shape is outputted from the displacement detector 9. As these similar operations are repeated, the inside of the scanning region 32a is sequentially scanned, until the x- and y-scanning operations are ended when the probe 10 comes to a position (xn, yn).

Here will be briefly described the z-fine movement to be made between the x- and y-scanning operations, The feedback circuit (as shown in FIG. 3) moves the probe 10 vertically by the displacement z in accordance with the roughness of the surface of the sample 32 so that the deflection of the probe 10, e.g., the cantilever may be constant. This displacement z has the quantity which is calculated by dividing the force F, as generated by feeing the voice coil 6 with the current I, by the total spring constant K of the first and second springs 11 and 12, as expressed by the following Formula:

$$z=F/K,$$

wherein the force F is proportional to the product of a magnetic field B between the voice coil 6 and the core rod 3 of the magnet 2 and the current I to flow through the voice coil 6.

Hence, the displacement z is proportional to the current I to flow through the voice coil 6, and the displacement x takes a value when the probe 10 traces the surface of the sample 32, so that the surface roughness of the sample 32 is proportional to the current I. In other words, the surface roughness of the sample 32 can be measured if the current to flow through the voice coil 6 is monitored. The linearity at this time is more excellent than that of the piezo scanner of the prior art.

As described hereinbefore, the z-coarse and z-fine movements and the x- and y-scanning operations can be done so that the present embodiment is easier in handling than and superior in safety to the piezo scanner of the prior art and can enlarge the scanning width. Moreover, the present embodiment realizes the probe scan and has a merit that it can inspect the surface of a sample as large as the semiconductor wafer.

In the foregoing embodiment, the thinner tube portion 14 and the thicker tube portion 15 are united with the casing 1 into the integral structure. However, the present invention should not be limited to the structure but can be modified such that the casing 1 and the thinner tube portion 14 are separated to make the thinner tube portion of an elastic material different from that of the casing 1. Moreover, the thinner tube portion may also be composed of a plurality of elastic filaments.

Figure 6A:
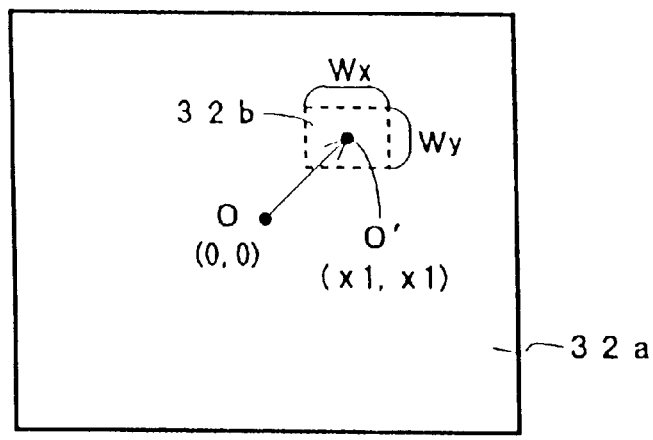
FIGS. 6A, 6B and 6C are diagrams for explaining the operations of a zoom device of the present invention.

Here will be described the operations of the case in which the surface of the sample 32 is measured by zooming it. First of all, the x- and y-scanning mechanisms are actuated to move the position 0, as indicated on the sample 32 by the probe 10, as illustrated in FIG. 6, to a position 0' to be measured by the zooming. Here, the following Formulas hold if the position 0 has coordinates (0, 0) whereas the position 0' has coordinates (x1, y1):

$$x1=\beta \cdot F1/k1;$$

and $$y1=\beta \cdot F2/k1.$$

Here, letter k1 indicates the composed transverse spring constant of the thinner tube portion 14 and the thicker tube portion 15, and letter β indicates a cantilever enlargement ratio. The spring constant k1 can be expressed by the following Formula (4):

[Formula 4]

$$k1=l/3EI_1 \cdot \{l^3+l_0(3l^2-ll_0-l_0^2)(I/I_0-1)\} \quad (4).$$

In short, the current, as matching the forces F1 and F2, is fed to the coil 25 in the direction x and the not-shown coil in the direction y.

Next, the heating coil 35 for the zooming operation is turned off to solidify the viscous element 36. Then, the leaf spring 37, as fixed at its one end on the spring 27, is firmly fixed at its other end on the holder 34. The action, although not shown, in the direction y is similar to that in the direction x. Thus, if the leaf spring 37 has a spring constant Kx in the direction x and if the force for the spindle 27 to act in the direction x is indicated by Fx to −Fx, the force Fx and the displacement of the probe 10, i.e., a scanning width Wx have the following relation:

$$Wx=\beta \cdot 2Fx/(k1+Kx).$$

On the other hand, if the leaf spring 37 has a spring constant Ky in the direction y, if the spring constant Ky is substantially equal to the spring constant k1, and if the force for the y-direction spring to act in the direction y is indicated by Fy to −Fy, the force Fy and the displacement of the probe 10, i.e., a scanning width Wy also have the following relation:

$$Wy=\beta \cdot 2Fy/(k1+Ky).$$

In short, the spring constants Kx and Ky of the leaf spring 37 are added to the composed transverse spring constant k1 of the thinner tube portion 14 and the thicker tube portion 15. If, in this state, the x- and y-scanning mechanisms are fed with the scanning currents in the directions X and Y, as shown in FIG. 4, a scanning range 32b is shown at (a) and (b) in FIG. 6, and the measured information of the scanning range 32b is fully displayed in a CRT 80, so that the zoomed (or enlarged) measured information is projected in the CRT 80. Incidentally, for a square scanning region, i.e., Wx=Wy, the coils of the x- and y-scanning mechanisms may be fed with electric currents to effect the spring constants Kx=Ky and the forces ±Fx=±Fy. Here will be described a second embodiment of the present invention. This embodiment is characterized in that the clamp 38 is provided so as to enlarge the zooming magnification. This clamp 38 pushes the center, i. e., the portion of one half length of the leaf spring 37. Then, the length of the leaf spring 37 is halved so that a spring constant K' is eight times as large as the foregoing constant Kx. That is, K'=8Kx. If the x- and y-scanning mechanisms are fed with the scanning currents in the directions x and y, as illustrated at (a) and (b) in FIG. 4, the force Fx for the spindle 27 to act in the direction x and the displacement of the probe 10, i.e., a scanning width W'x have the following relation:

$$Wx'=\beta \cdot 2Fx/(k1+8Kx).$$

On the other hand, the force Fy for the not-shown y-direction spring to act in the direction y and the displace or a scanning width Wy' of the probe 10 also have the following relation:

$$Wy'=\beta \cdot 2Fy/(k1+8Ky).$$

Figure 6B:
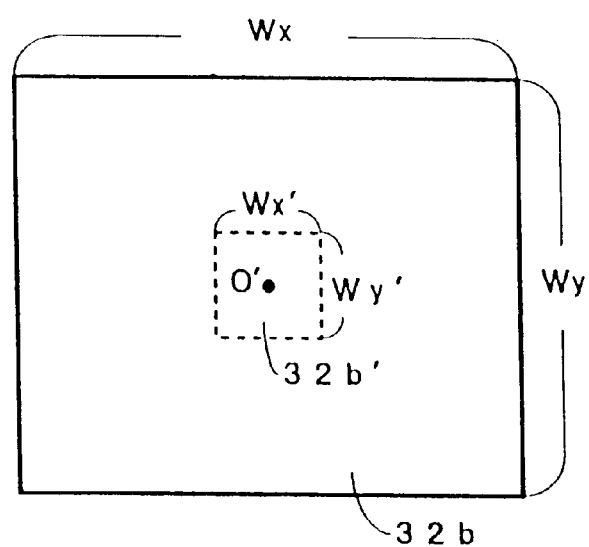
Figure 6C:
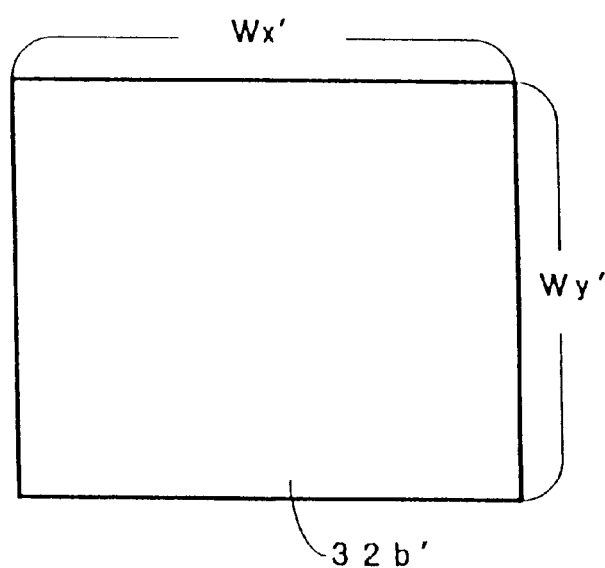
Figure 7:
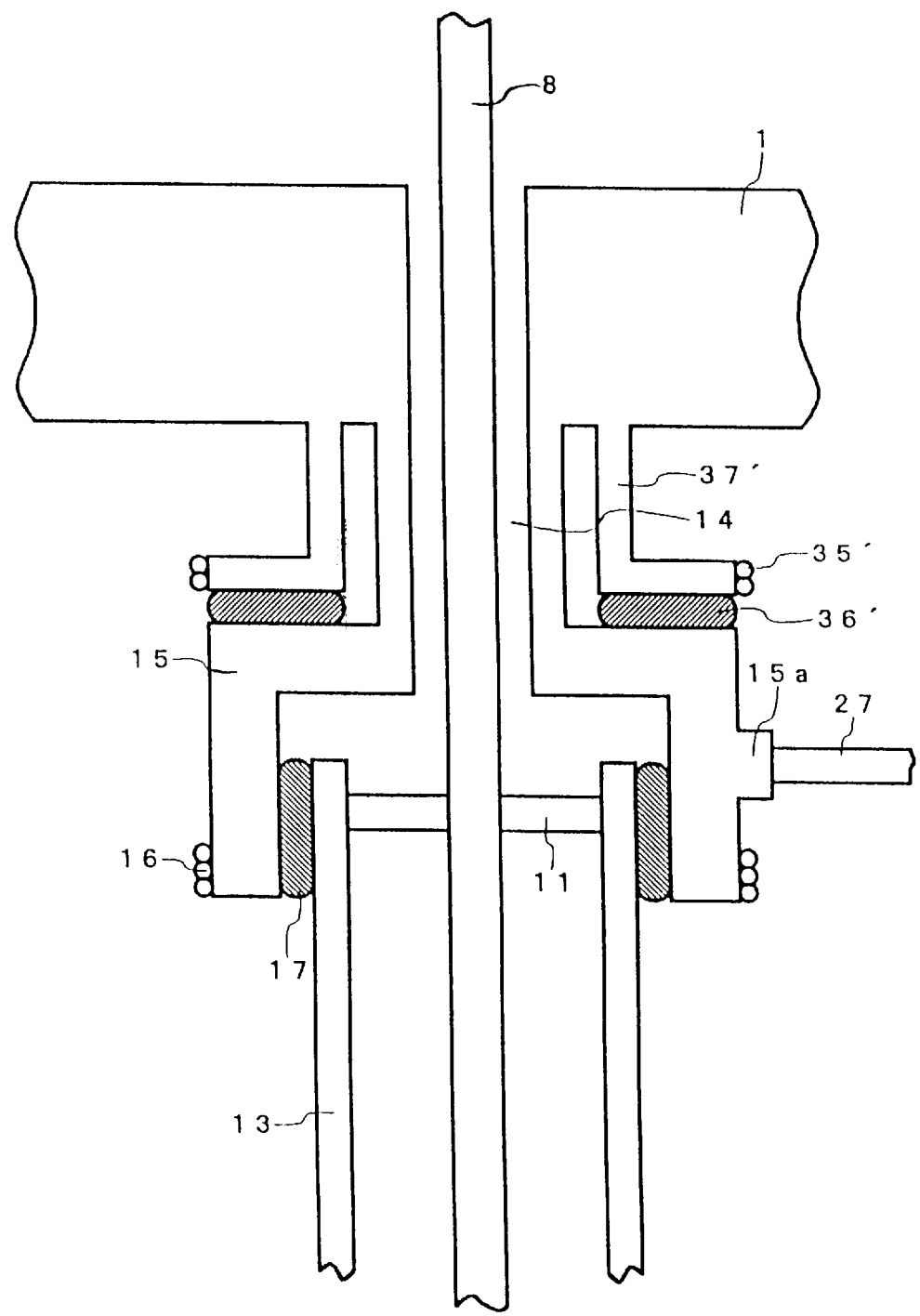
FIG. 7 is a construction diagram of an essential portion of the third embodiment of the probe scanning apparatus of the present invention.
Figure 8:
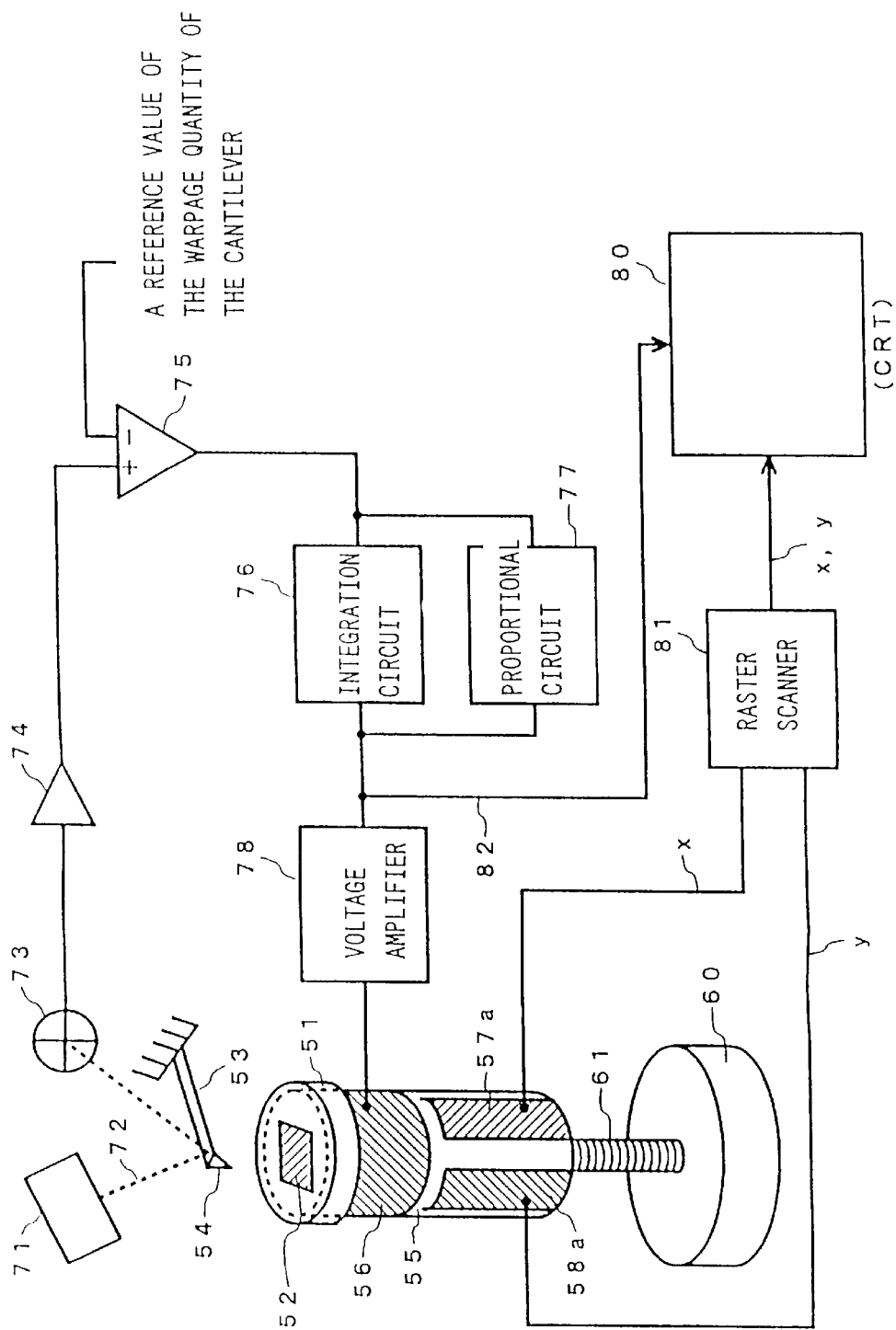
FIG. 8 is a diagram showing a schematic construction of the piezo scanner of the prior art.

If, in this state the x- and y-scanning mechanisms are fed with the scanning currents in the directions x and y, as illustrated in FIG. 4, the scanning range is 32b', as illustrated in FIG. 6(b), and the measured information of the scanning range 32b' is fully displayed in the CRT 80 so that this CRT projects the measured result enlarged by about nine times, as shown in FIG. 6C. Incidentally, the position in which the leaf spring 37 is clamped by the clamp 38 should not be limited to that of one half length. Next, a third embodiment of the present invention will be described with reference to FIG. 7. This embodiment is characterized in that a heating coil 35', a viscous element 36' and a cylindrical tube 37' are provided in place of the holder 34, the heating coil 35, the viscous element 36, the leaf spring 37 and the clamp unit 38 of FIG. 1. Specifically, as shown: there is disposed around the thinner tube portion 14 the cylindrical tube 37' which leads from or is fixed on the casing 1 at its upper end and which is provided with a seat portion at its lower end; the heating coil 35' is wound around the seat portion; and the viscous element 36' made of glycol phthalate is sandwiched between the thicker tube portion 15 and the cylindrical tube 37'. Incidentally, a spring constant kT of the tube 371 in the bending direction may be preferably set to kT=γk1 (wherein γ=1 to 10).

In this embodiment, without the zooming operation, the heating coil 35' is activated by the temperature controller to raise the temperature of the viscous element 36' to a level higher than the melting point. With the zooming operation, on the other hand, the origin O (0, 0) is shifted to the zoom origin O' (x, y), and the heating coil 35' is inactivated by the temperature controller to lower the temperature of the viscous element 36' to a level lower than the melting point. As a result, the thicker tube portion 15 and the seat portion of the cylindrical tube 37' are firmly fixed by the viscous element 36'.

In this state, the coils 25 and 35 of the x- and y-scanning mechanisms are fed with the currents to generate the forces ±Fx and ±Fy. Then, the scanning widths Wx and Wy are narrowed to allow an enlarged view to be observed, as follows:

$$Wx=\beta \cdot 2Fx/(k1+KT);$$

and $$Wy=\beta \cdot 2Fy/(k1+KT).$$

As apparent from the description thus far made, according to the present invention, the voice coil motors, as arranged in the three directions x, y and z, are integrated to move the probe in the three directions x, y and z by their forces. Thus, the invention has an effect that no consideration is required into safety against a high voltage unlike the piezo scanner of the prior art. Moreover, the probe supporting means of an elastic material is pushed or pulled by the forces coming from the voice coil motors, and another effect is that the x- and y-scans can be achieved over wide ranges by the weak forces. Thanks to the probe scans, still another effect is that the surface of a large-sized sample can be inspected.

According to one aspect of present invention there is achieved an effect that an arbitrary position in the X- and y-scanning regions of the sample surface can be zoomed. This raises another effect that the sample surface can be measured more accurately. According to another aspect of the present invention there is achieved another effect that the zooming magnification can be drastically enlarged simple construction.

What is claimed is:

1. A probe scanning apparatus for use in a device for measuring the shape of a surface or the physical properties of a sample, the probe scanning apparatus comprising:

a probe;

voice coil motors for generating a moving force in each of three directions x, y and z upon activation thereof; and probe supporting means mounted for movement in the three directions x, y and z by the moving forces generated by the voice coil motors upon activation thereof to effect coarse/fine movement of the probe in the direction z and to scan the probe in the directions x and y, the probe supporting means having a thinner tube portion and a thicker tube portion extending in the direction z, wherein the probe is scanned in the directions x and y by applying the moving forces generated by the x- and y-direction voice coil motors in the directions x and y to a portion of the thicker tube portion.

2. A probe scanning apparatus as set forth in claim 1; wherein the length of the thinner tube portion is set to maximize the displacement of the thicker tube portion for the moving force to be applied to the portion of the thicker tube portion.

3. A probe scanning apparatus as set forth in claim 1; wherein the probe supporting means includes a probe supporting member supported through a viscous element by the thicker tube portion extending in the direction z; and wherein the viscous element is softened during coarse movement of the probe in the direction z and hardened during fine movement of the probe in the direction z.

4. A probe scanning apparatus for use in a device for measuring the shape of a surface or the physical properties of a sample, the probe scanning apparatus comprising:

a probe;

voice coil motors for generating a moving force in each of three directions x, y and z;

probe supporting means mounted for movement in the three directions x, y and z by the moving forces generated by the voice coil motors to effect corresponding movement of the probe; and zooming means for realizing a zooming function by limiting the moving range of the probe supporting means.

5. A probe scanning apparatus as set forth in claim 4; wherein the zooming means includes means for loading the x- and y-direction forces to be applied to the probe supporting means.

6. A probe scanning apparatus as set forth in claim 4; wherein the zooming means comprise a holder, a viscous element fitted in the holder, an elastic element embedded in the viscous element, and heating means for heating the viscous element; and wherein when the temperature of the viscous element is made lower than the melting point thereof, the x- and y-direction forces to be applied to the probe supporting means are loaded by the elastic element.

7. A probe scanning apparatus as set forth in claim 6; further comprising means for clamping a portion of the elastic element.

8. A probe scanning apparatus as set forth in claim 4; wherein the zooming means includes means for effecting a plurality of zooming stages.

9. A probe scanning apparatus as set forth in claim 4; wherein the zooming means comprises a cylindrical tube made of an elastic material and disposed coaxial with the probe supporting means, an elastic element fitted between the cylindrical tube and a portion of the probe supporting means, and heating means for raising the temperature of the viscous element to a temperature higher than the melting point thereof; and wherein when the temperature of the viscous element is lowered to a temperature lower than the melting point thereof, the x- and y-direction forces to be applied to the probe supporting means are loaded by the elastic element.

10. A probe scanning apparatus as set forth in claim 9; further comprising a casing, the cylindrical tube having a first end extending from the casing, and the elastic element being fitted between a second end of the cylindrical tube and the portion of the probe supporting means.

11. A probe scanning apparatus as set forth in claim 10; wherein the first end of the cylindrical tube is fixed to the casing.

12. A probe scanning apparaturs for use in a device for measuring the shape of a surface or the physical properties of a sample, the probe scanning apparatus comprising:

a probe;

voice coil motors for generating a moving force in each of three direction x, y and z upon activation thereof; and probe supporting means mounted for movement in the three directions x, y and z by the moving forces generated by the voice coil motors upon activation thereof to effect coarse/fine movement of the probe in the direction z and to scan the probe in the directions x and y, the probe supporting means having a first tubular portion and a second tubular portion extending in the direction z, and a probe supporting member supported through a viscous element by the second tubular portion, the second tubular portion having a diameter greater than that of the first tubular portion.

13. A probe scanning apparatus as set forth in claim 12; wherein the viscous element is disposed between the second tubular portion and the probe supporting member.

14. A probe scanning apparatus for use in a device for measuring the shape of a surface or the physical properties of a sample, the probe scanning apparatus comprising:

a probe;

voice coil motors for generating a moving force in each of three directions x, y and z upon activation thereof;

probe supporting means mounted for movement in the three directions x, y and z by the moving forces generated by the voice coil motors upon activation thereof to effect coarse/fine movement of the probe in the direction z and to scan the probe in the directions x and y, the probe supporting means having a tubular support member mounted for movement in the direction z; and first, second and third rods for connecting the probe supporting means to the voice coil motors and mounted for respective movement in the directions x, y and by the moving forces generated by the voice coil motors upon activation thereof, the third rod being supported by the tubular support member of the probe supporting means through spring elements and a viscous element to control movement of the tubular support member in the direction z.

15. A probe scanning apparatus as set forth in claim 14; wherein the tubular support member of the probe supporting means is generally cylindrical-shaped; and wherein the third rod extends through the cylindrical-shaped tubular support member in coaxial relation thereof.

16. A probe scanning apparatus as set forth in claim 14; wherein the probe supporting means has a first tubular portion and a second tubular portion extending in the direction z, the second tubular portion having a greater thickness than that of the first tubular portion; and wherein the viscous element is disposed between the tubular support member and the second tubular portion.

17. A probe scanning apparatus as set forth in claim 14; further comprising a plurality of elastic elements for connecting the first and second rods to the x- and y-direction voice coil motors, respectively, and for guiding movement of the first and second rods in the respective directions x and y.

18. A probe scanning apparatus as set forth in claim 14; further comprising a pair of fine wire portions for connecting the first and second rods to the x- and y-direction voice coil motors, respectively, and for respectively absorbing strain of the first and second rods.

19. A probe scanning apparatus as set forth in claim 14; further comprising an elastic element for connecting the third rod to the z-direction voice coil motor and for guiding movement of the third rod in the direction z.

20. A probe scanning apparatus as set forth in claim 14; further comprising a fine wire portion for connecting the third rod to the z-direction voice coil motor and for absorbing strain of the third rod.

21. A probe scanning apparatus as set forth in claim 14; further comprising an intermediate spring member for supporting the third rod in the tubular support member to suppress bending of the third rod.

* * * * *